(12) United States Patent
Kim

(10) Patent No.: US 11,774,934 B2
(45) Date of Patent: Oct. 3, 2023

(54) FACILITY DIAGNOSIS METHOD USING FACILITY DIAGNOSIS SYSTEM

(71) Applicant: Win Tech Co., Ltd, Daegu (KR)

(72) Inventor: Dug Kyung Kim, Daegu (KR)

(73) Assignee: Win Tech Co., Ltd, Daegu (KR)

( * ) Notice: Subject to any disclaimer, the term of this patent is extended or adjusted under 35 U.S.C. 154(b) by 756 days.

(21) Appl. No.: 16/960,682

(22) PCT Filed: Jun. 21, 2018

(86) PCT No.: PCT/KR2018/006988
§ 371 (c)(1),
(2) Date: Jul. 8, 2020

(87) PCT Pub. No.: WO2019/146849
PCT Pub. Date: Aug. 1, 2019

(65) Prior Publication Data
US 2020/0333759 A1    Oct. 22, 2020

(30) Foreign Application Priority Data
Jan. 29, 2018  (KR) ........................ 10-2018-0010541

(51) Int. Cl.
*G05B 19/05* (2006.01)
*G07C 3/00* (2006.01)
(Continued)

(52) U.S. Cl.
CPC ....... *G05B 19/058* (2013.01); *G05B 23/0267* (2013.01); *G06F 11/32* (2013.01);
(Continued)

(58) Field of Classification Search
CPC .............. G05B 19/058; G05B 23/0267; G05B 23/0229; G05B 2219/14058; G05B 23/027; G05B 2219/14006; G06F 11/32; G06F 12/0238; G06N 20/00; G06Q 50/04; G07C 3/005; G07C 5/0866; H04L 67/12;
(Continued)

(56) References Cited

FOREIGN PATENT DOCUMENTS

JP  2008-305259 A  12/2008
KR  1995-0000022 B1  1/1995
(Continued)

OTHER PUBLICATIONS

International Search Report dated Oct. 15, 2018 for corresponding international application No. PCT/KR2018/006988.

*Primary Examiner* — Charles R Kasenge
(74) *Attorney, Agent, or Firm* — Hauptman Ham, LLP

(57) ABSTRACT

The present invention relates to an equipment diagnosis method using equipment diagnosis system comprising: an imaging module (110) for collecting image data by photographing the equipment having an equipment controller, in which a PLC is loaded, embedded therein; a diagnostic module (120) including hardware having software for diagnosing whether the equipment is normal or abnormal; and a plurality of IoT sensor units (130) for monitoring an object to be monitored, and thus a user can quickly diagnose, identify, and cope with a specific cause of an equipment failure on the basis of objective data provided from a PLC memory area, and image file, and an IOT sensor unit at the occurrence of various types of events generated by a diagnostic module for each condition designated by the user according to the state of equipment.

3 Claims, 2 Drawing Sheets

(51) Int. Cl.

| | | |
|---|---|---|
| *G06Q 50/04* | (2012.01) | |
| *G06F 12/02* | (2006.01) | |
| *G06N 20/00* | (2019.01) | |
| *H04L 29/08* | (2006.01) | |
| *H04L 67/12* | (2022.01) | |
| *G05B 23/02* | (2006.01) | |
| *G06F 11/32* | (2006.01) | |
| *G16Y 10/25* | (2020.01) | |
| *G16Y 40/10* | (2020.01) | |
| *G16Y 40/20* | (2020.01) | |

(52) U.S. Cl.
CPC ......... *G06F 12/0238* (2013.01); *G06N 20/00* (2019.01); *G06Q 50/04* (2013.01); *G07C 3/005* (2013.01); *H04L 67/12* (2013.01); *G05B 23/0229* (2013.01); *G05B 2219/14058* (2013.01); *G16Y 10/25* (2020.01); *G16Y 40/10* (2020.01); *G16Y 40/20* (2020.01)

(58) Field of Classification Search
CPC ........ G16Y 10/25; G16Y 40/10; G16Y 40/20; Y02P 90/02; Y02P 90/30; G06T 7/00; G06T 7/001
See application file for complete search history.

(56) References Cited

FOREIGN PATENT DOCUMENTS

| | | |
|---|---|---|
| KR | 10-0867773 B1 | 11/2008 |
| KR | 10-2013-0102278 A | 9/2013 |
| KR | 10-2014-0068698 A | 6/2014 |
| KR | 10-1566358 B1 | 11/2015 |
| KR | 10-1668464 B1 | 10/2016 |
| KR | 10-1748282 B1 | 6/2017 |

FACILITY DIAGNOSIS METHOD USING FACILITY DIAGNOSIS SYSTEM

CROSS-REFERENCE TO RELATED APPLICATION

The present application is a national stage filing under 35 U.S.C § 371 of PCT application number PCT/KR2018/006988 filed on Jun. 21, 2018 which is based upon and claims the benefit of priorities to Korean Patent Application No. 10-2018-0010541 filed on Jan. 29, 2018, in the Korean Intellectual Property Office, which are incorporated herein in their entirety by reference.

TECHNICAL FIELD

The present disclosure relates to an disclosure regarding a facility diagnosis method using a facility diagnosis system, and more particularly, to a facility diagnosis method of, when a facility, in which a facility controller on which a PLC is mounted is embedded, is managed, allowing a user to promptly and accurately recognize a cause of a failure of a facility at an event generation time point for a condition designated by a user, based on a PLC memory area, an image file, and objective data provided by an IoT sensor unit by using a facility diagnosis system provided with a diagnostic module, an imaging module, and an IoT sensor unit whereby a failure of the facility that is not difficult to recognize can be effectively coped with.

BACKGROUND ART

In general, a facility generally refers to a machine or a device used for producing or manufacturing a product in the whole industrial fields or all combinations thereof.

In recent years, facilities for automating control, management, and overall operations of production of products are realized through factory automation using machine tools, robots, and computers, and not only automation of devices but also automation of control of processes for controlling the devices in a programmable state by computers are also made.

Accordingly, industrial facilities such as automation component assemblers, various testers, and machining apparatuses are equipped with PCBs, on which PLCs, computers, and microprocessors are mounted, and are equipped with final user-specific programmed controllers.

For example, in a brief description of a configuration of a vehicle assembling facility known in Korean Patent No. 10-0867773, the vehicle assembling facility includes a central management server that stores and manages vehicle information that is necessary for assembling a vehicle, a plurality of assembly facilities that assemble the vehicle according to the vehicle information, a plurality of facility control units that are connected to the assembly facilities and control the assembly facilities, and a plurality of control PCs that are connected to the plurality of facility control units and communicate with the central management server, and the facility control units include PLC equipment of different models.

Meanwhile, an industrial facility may cause an error such as a malfunction of a facility due to various unpredicted problems in an operation process thereof. When the error of the facility repeatedly occurs, production efficiency is remarkably lowered.

Consequently, although an engineer always resides around a facility to recognize a cause of a failure of the facility, it is difficult to cope with a failure more precisely and promptly with an inefficiency due to accumulation of labor fatigue, a monitoring system depending on naked eyes, and a scheme of simply estimating the cause.

Accordingly, a facility diagnosing technology for precisely and promptly recognizing the causes of various failures occurring in the process of developing or managing a facility to cope with the failure has been developed and provided, and a description of a schematic configuration thereof will be made through a method for diagnosing a failure of a facility of a production line known in Korean Patent No. 10-0084195.

A method for diagnosing a failure of a facility in a production line sequentially controlled to execute a plurality of steps in operation blocks in a predetermined sequence thereof, includes the steps of: classifying a plurality of operations executed by a facility in a production line into a plurality of operation blocks for a series of operation units independently executed from the starts to the ends of the operations in a normal state of the facility; classifying the plurality of operation blocks into a plurality of operation steps; measuring operation times from the starts to the ends of the series of operation steps in the operation blocks; storing the completions of the operations in the operation steps in the operation blocks; comparing the reference operation times for the operation blocks with the measured operation times; and specifying the failure operation steps for the blocks in response to the state of the completions of the operations in the operation steps and the time differences in the comparison step.

Meanwhile, Korean Patent Application Publication No. 10-2013-0102278 discloses a facility device monitoring system including: a plurality of facility devices including a display part, an audio output part, and a tower lamp configured to display an operation state, and a monitoring device configured to transmit and receive a signal representing operation states of the plurality of facility devices by using a PLC module, wherein the PLC module includes a control program that monitors the operation states of the plurality of facility devices based on the transmitted and received signal and outputs the result through at least one of a display part and an audio output part, and a facility device monitoring method.

DETAILED DESCRIPTION OF THE INVENTION

Technical Problem

The method for diagnosing a failure of a facility of a production line, to which the conventional technology is applied, includes a failure diagnosing apparatus including: a vehicle assembly line (hereinafter, a facility); line failure diagnosing units that are installed in the whole facility to diagnose a line failure; area failure diagnosing units that are installed for line areas to diagnose the failures of the areas; and device failure diagnosing units that are installed for the mounted devices for areas to diagnose the failures of the devices, wherein failures of the lines, the areas, and devices are sequentially diagnosed.

That is, according to the failure diagnosing apparatus of the conventional technology, the failure diagnosing apparatuses are installed for the whole lines, areas, and devices, and a diagnosis result of a failure is made if it is determined to be abnormal by measuring operation times of the lines, areas, and devices, that is, in-output times and comparing them with reference times.

Accordingly, because abnormalities are simply diagnosed only by measuring the process progress times of the parts of the facility, it is difficult to clearly recognize whether a direct cause of a failure is in the facility itself or is another external factor such as a material.

Moreover, because the in-out times are frequently normally maintained during operations of the lines even if the facility substantially fails, it is difficult to secure the precision of the diagnosis of the failure with the method of the conventional technology.

Meanwhile, the facility device monitoring system of the other example performs monitoring by connecting the driving circuits of the tower lamps provided in the facility devices and the PLC modules in one-to-one correspondence and collecting operation signals of the tower lamps by using the PLC modules and outputting the operational states.

Accordingly, the conventional technology has a limit because the facility device simply recognizes an operation thereof but it is difficult to recognize a detailed cause and a generation time point of the failure of the devices.

Technical Solution

In accordance with an aspect of the present disclosure, there is provided a facility diagnosis method using a facility diagnosis system including an imaging module 110 configured to photograph a facility, in which a facility controller on which a PLC is mounted is embedded, and a diagnostic module 120 including hardware, on which software for diagnosing a failure of the facility is mounted, the facility diagnosis method including:

a diagnosis event generating step S11 of receiving and detecting a PLC memory map access signal P output by the facility controller, by the diagnostic module 120, and generating diagnosis events for kinds corresponding to a plurality of preset event conditions, in the diagnostic module 120;

a storage range setting step S12 of arbitrarily selecting ranges of state information and a data value of a PLC memory area, which is to be stored at a diagnosis event generation time point, and setting a time area of a before/after range with reference to the diagnosis event generation time point; and a file storing step S13 of storing the state information and the data value of the PLC memory area in the range selected in the storage range setting step in real time, by the diagnostic module 120, wherein the diagnostic module 120 is configured to selectively perform: a master memory pattern setting step S21 of mounting memory pattern recognition software, storing state information and a data value of the PLC memory area during one cycle of a normal state operation of the facility, and setting the state information and the data value stored, as a master memory pattern; and a memory pattern notifying step S22 of reading the PLC memory area in real time during an operation of the facility, comparing the read PLC memory area with the master memory pattern, and displaying an area in which the read PLC memory does not coincide with the master memory pattern, and wherein in the file storing step S13, the state information and the data value of the PLC memory area are stored in the form of data files for kinds of diagnosis events and generation dates and times, areas for an input/output, an internal relay, a link relay are converted in unit of bits to display an operational state thereof, areas for a data register and a link register are converted in unit of decimal numbers after being read in unit of words to be displayed and stored, and to be provided to a user.

An image recognition application is mounted on the imaging module 110 of the facility diagnosis system, the facility diagnosis method including:

a master image setting step S31 of, after setting an image area in a normal state of a monitoring target, accumulating edge characteristics of a plurality of images in unit of pixels and learning an averaged master image;

a matching rate setting step S32 of storing a matching rate and a storage condition, in which border values are set in a normal state and an abnormal state of the monitoring target;

an image monitoring event generating step S33 of receiving and detecting an image monitoring event signal output by the imaging module 110, by the diagnostic module 120, generating an image monitoring event that coincides with a preset image monitoring event condition, in the diagnostic module 120, and transmitting a signal to the imaging module 110; and an image file storing step S34 of acquiring a current state image of the monitoring target at the image monitoring event generating time point by the imaging module 110, and storing the current state image as an image file if a storage condition is satisfied according to the matching rate after the current state image is compared with the master image, and wherein the image file storing step S34 includes:

acquiring and editing image data of the monitoring target photographed by an image device in a time area of the before/after range with reference to the image monitoring event generation time point, and storing the edited image data as an image file.

The facility diagnosis system includes a plurality of IoT sensor units 130 configured to monitor the monitoring target, the facility diagnosis method including:

an IoT event generating step S41 of receiving and detecting an IoT monitoring event signal through a hardware contact point and a wired/wireless communication with the IoT sensor units 130, by the diagnostic module 120, generating an IoT monitoring event corresponding to a preset IoT monitoring event condition, in the diagnostic module 120, and transmitting a signal to the imaging module 110;

an image file storing step S42 of acquiring and editing image data of the monitoring target photographed by an imaging device in a time area of a before/after range with reference to the IoT monitoring event generation time point and storing the edited image data as an image file; and an IoT notifying step S43 of transmitting an IoT monitoring event generation notification to a smartphone of the user, by the diagnostic module 120.

Accordingly, an objective of allowing a user to recognize a cause of an abnormal operation of a facility more promptly and precisely based on objective data analyzed by a diagnostic module, an imaging module, and an IoT sensor unit when the abnormal operation occurs in the facility.

Advantageous Effects

The present disclosure includes a facility diagnosis system including a diagnostic module, an imaging module, and an IoT sensor unit, and can more effectively cope with a failure of a facility, a cause of which cannot be easily recognized, by generating various kinds of events according to a condition designated by the user.

In particular, the present disclosure can allow a user to precisely recognize a cause of an abnormal operation of a facility in more detail by extracting objective data from a PLC memory area at an event generation time point and converting the data into a form of data files, by which the user may recognize the data more easily and conveniently for the kind and the generation date and time of the event, to provide the data to the user.

Further, because image data are acquired from a general imaging device according to an event generation time point based on an image recognition algorithm utilizing an OPEN CV technology and an image file is provided through matching by image processing, a cause of an abnormal operation can be easily recognized in a software way even without introducing a high-priced vision system.

In addition, because an event can be generated through a hardware contact point or a wired/wireless communication by applying an IoT technology to the facility diagnosis system and a notification is provided to the user in real time through a smartphone, a prompt measure can be made.

MODE FOR CARRYING OUT THE INVENTION

Figure 1:
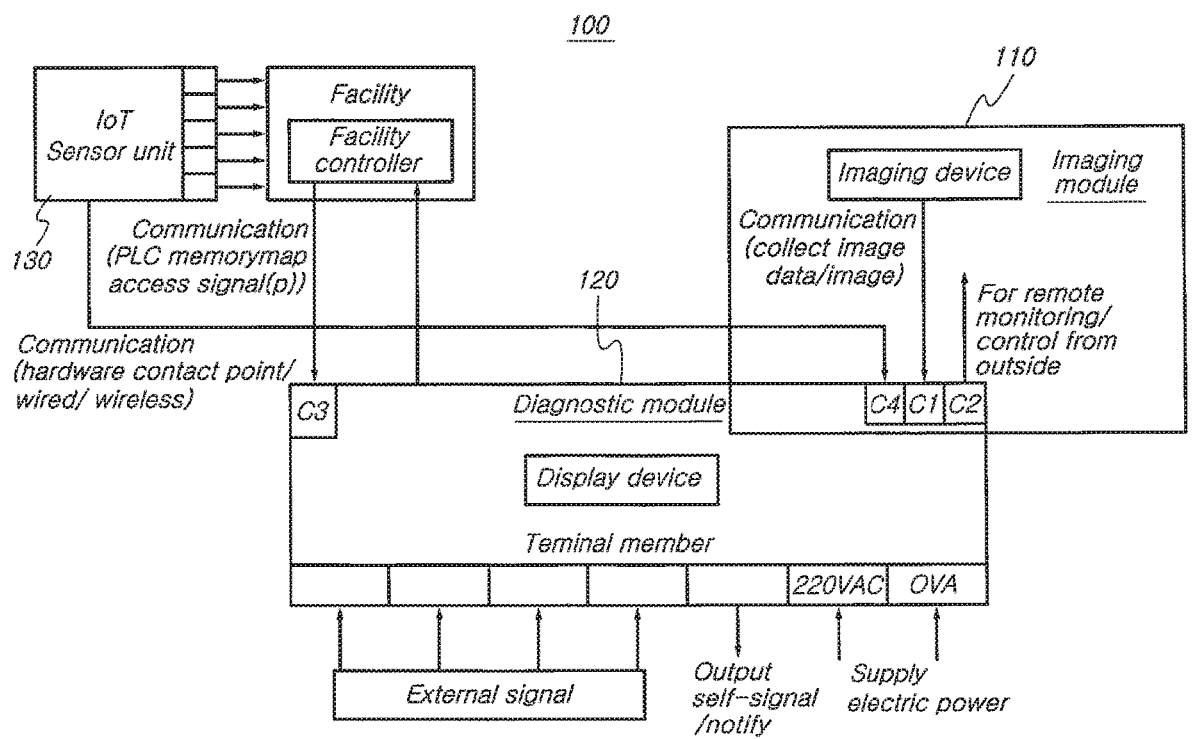
FIG. 1 is a block diagram illustrating a schematic structure of a facility diagnosis system, to which the present disclosure is applied.
Figure 2:
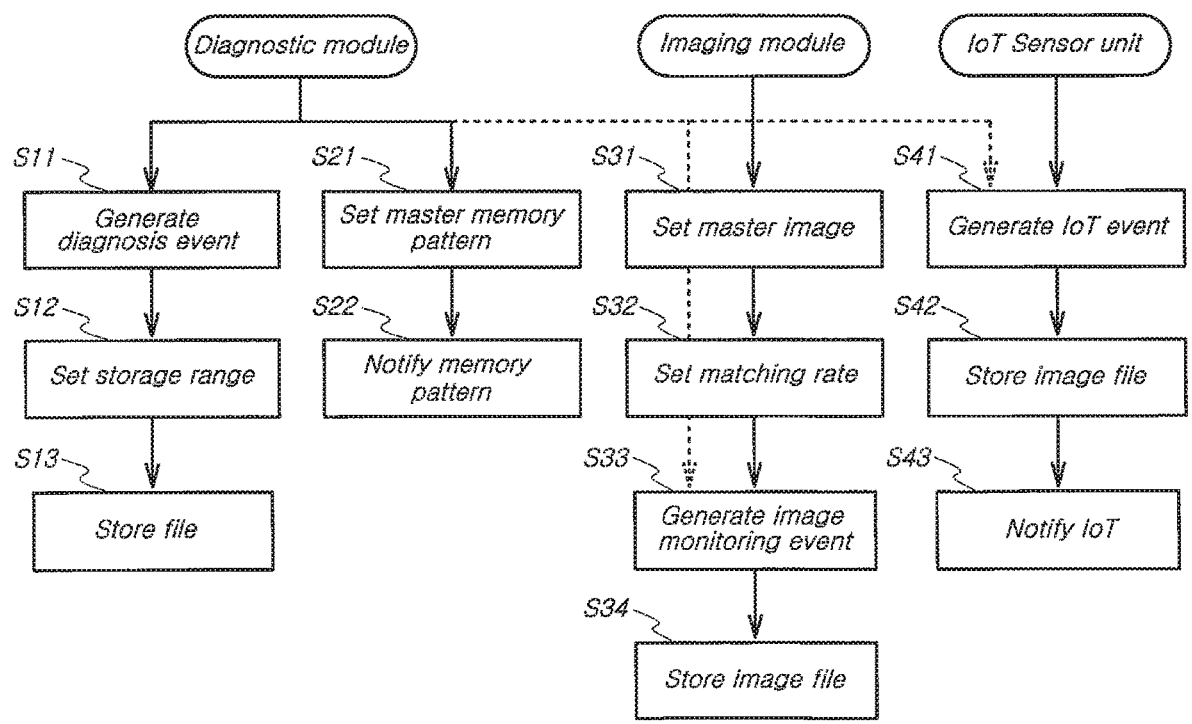
FIG. 2 is a schematic process flowchart of a facility diagnosis method using a facility diagnosis system according to the present disclosure.

A facility diagnosis method using a facility diagnosis system, to which the technology of the present disclosure is applied, is a technology of, when an abnormal operation occurs during management of a facility, in which a facility controller on which a PLC is mounted is embedded, allowing a user to recognize a detailed cause of the abnormal operation more promptly and precisely, based on objective data analyzed by a diagnostic module 120, an imaging module 110, and an IoT sensor unit 130, particularly thereby making it possible to more effectively diagnose a failure to take a measure, the cause of which cannot be easily recognized in the operation process of the facility.

To achieve this, a facility diagnosis method using a facility diagnosis system is a facility diagnosis method using a facility diagnosis system including an imaging module 110 configured to photograph a facility, in which a facility controller on which a PLC is mounted is embedded, and a diagnostic module 120 including hardware, on which software for diagnosing a failure of the facility is mounted, details thereof are as follows.

The facility diagnosis method of the present disclosure includes a diagnosis event generating step S11, a storage range setting step S12, and a file storing step S13.

The diagnosis event generating step (S11) is a step of receiving and detecting a PLC memory map access signal P output by the facility controller, by the diagnostic module (120), and generating diagnosis events for kinds corresponding to a plurality of preset event conditions, in the diagnostic module 120.

The facility controller is a device embedded in a facility to control an automation facility, and includes a printed circuit board (PCB), on which a programmable logic controller (PLC), a computer, and a microprocessor are mounted.

A PLC is a control unit that realizes a program control for a basic facility operation sequence control, a control by numerical calculations, a communication function, and the like by replacing a device such as a relay, a timer, a counter, or the like embedded on a control panel mounted on a conventional facility by a semiconductor device.

The PLC includes hardware including an input/output module, a power supply, a communication module, and a peripheral device, including a CPU and a memory, and PLC software.

The PLC memory is divided into areas for a user program memory, a data memory, and a system memory.

The user program memory is an area in which a user-specific program is stored. The PLC allows the user-specific program to perform an operation of controlling a device connected to the PLC. The data memory is an area in which device information, such as contact states and setting values of an input/output, an auxiliary relay, a timer, and a counter, is stored. The system memory is an area in which a system program, such as an operating system (OS) written by a PLC manufacturer, is stored.

The user-specific program is a control program written by a user according to a facility that is to be controlled, and performs various control functions by inputting and outputting a signal through an input/output module of a PLC and accessing and communicating with an interface.

The input/output module of the PLC directly connects an input/output circuit and a device that constitutes a facility, and basically includes a signal control scheme by a digital unit or an analog unit, in which a converter is embedded. Further, an input/output communication by a PLC memory map access signal P is made possible. Because known technologies may be referenced for the general technical issues of the PLC, a detailed description thereof will be omitted.

The diagnostic module 120 includes a plurality of terminal members, a plurality of communication ports for communication of the PLC and an imaging module 110, which will be described below, a PCB, on which software for analyzing and processing input data and diagnosing a failure of the facility, and a display device that sets and changes various parameters through a software interface and identifies the stored image data.

The diagnostic module 120 receives a PLC memory map access signal P from the PLC input/output module and generates an event. The user may designate a signal, which will be used as a PLC memory map access signal, according to a situation of the facility by using the input/output module of the PLC or a memory area signal on the PLC program.

The diagnostic module 120 generates an event that coincides with an event generation condition by a preset parameter. With reference to the generation time point of the event, the diagnostic module 120 transmits a signal to the imaging module 110, which will be described below, and allows the captured image data to be edited and stored according to setting of a user condition, and in particular, analyzes the state information and the data values of the PLC memory area and provides the state information and the data values analyzed such that the state information and the data values are used for diagnosis of a failure of the facility.

The storage range setting step (S12) is a step of arbitrarily selecting ranges of state information and a data value of a PLC memory area, which is to be stored at a diagnosis event generation time point, and setting a time area of a before/after range with reference to the diagnosis event generation time point.

Because device information and data values of various kinds, such as an input/output, an internal relay, and a link relay, are stored in the data memory area of the PLC memory, in the storage range setting step (S12), the user arbitrarily selects a range of the input/output state information and the data values, which will be read and stored, and a time range which will be stored is set with reference to the diagnosis event generation time point.

The file storing step (S13) is a step of storing the state information and the data value of the PLC memory area in the range selected in the storage range setting step (S12) in real time, by the diagnostic module 120.

In particular, in the file storing step (S13), the state information and the data values of the PLC memory area are stored in the form of data files for kinds of the diagnosis events and dates and times of the generations of the diagnosis events and are provided to the user, and thus the user can promptly and precisely take measures based on the stored files.

Further, in the file storing step (S13), areas for an input/output, an internal relay, and a link relay of the PLC memory area are converted in unit of bits to display an operational state of the PLC memory area, areas for a data register and a link register are stored as data files for converting the data register and the link register in unit of decimal numbers after reading the data register and the link register in unit of words to display the data register and the link register.

The input/output area is a device that stores on/off data and data for delivering CPU calculation result data of a device (for example, a switch, a sensor, a lamp, or a solenoid) connected to the input/output module of the PLC, and displays state information of an input/output contact point. The internal relay area is a device that stores ON/OFF contact point data of a CPU. The link relay is a device that shares data during communication between CPUs. The data register is a device that stores internal data in the CPU. The link register is a device that shares word data between CPUs during communication. Known technologies may be referenced for detailed functions of the device applied to the PLC.

The CPU of the PLC stores and processes all data by 1 or 0. Accordingly, because the numerical calculations also processed by binary numbers, it is difficult for a user to easily recognize the contents of data when the data are stored in files in this state. Accordingly, in the file storing step (S13), because an ON/OFF operation is displayed in unit of bits according to the operational characteristics of the devices and the data in unit of 16 bits or 32 bits are converted into decimal numbers after being read in unit of words to be displayed, the user can more conveniently and promptly recognize the stored data files when reading the data files.

[Modes for Carrying out the Invention]

Meanwhile, in the facility diagnosis method using a facility diagnosis system of the present disclosure, memory pattern recognition software is mounted on the diagnostic module 120, and the facility diagnosis method includes a master memory pattern setting step (S21) and a memory pattern notifying step (S22).

The master memory pattern setting step (S21) is a step of storing state information and a data value of the PLC memory area during one cycle of a normal state operation of the facility, and setting the state information and the data value stored, as a master memory pattern.

That is, the diagnostic module 120 stores state information and data values of the PLC memory area in a range preset by the user in a storage device of the diagnostic module 120 while one cycle of normal operations of the facility is performed in conjunction with the communication module of the PLC, and thus a master memory pattern by memory pattern recognition software is set.

The memory pattern notifying step (S22) is a step of reading the PLC memory area in real time during an operation of the facility, comparing the read PLC memory area with the master memory pattern, and displaying an area in which the read PLC memory does not coincide with the master memory pattern.

Meanwhile, in the facility diagnosis method using a facility diagnosis system of the present disclosure, an image recognition application is mounted on the imaging module 110, and the facility diagnosis method includes a master image setting step (S31), a matching rate setting step (S32), an image monitoring event generating step (S33), and an image file storing step (S34).

The imaging module 110 includes an imaging device that normally photographs a monitoring target, and consistently stores recent image data of an appropriate capacity.

The imaging device includes a camera or a CCTV that is included and embedded in the facility diagnosis system 100 or installed remotely. One or more imaging devices are connected to a connection port provided in the diagnostic module 120 to transmit and receive a signal.

The image recognition application is software, on which an image recognition comparing algorithm based on an OPEN CV technology is mounted, and which allows a master image to be stored and matched by using a general imaging device.

An open source computer vision (OPEN CV) is an open programing library for realizing a real-time computer vision with software, and may realize functions, such as an operation, recognition, tracking, and identification of a monitoring target through image processing.

A conventional automation line performs an inspection, such as an inspection of assembly of a material, an inspection of dissimilar products, or an inspection of size by using a sensor or a vision system (a machine vision), and a CCTV in circulation employs a scheme of storing a real-time image or a full image through a motion detection scheme. Meanwhile, the present disclosure uses an image recognition application and a general imaging device that are realized based on an OPEN CV instead of constructing a conventional high-priced vision system.

The master image setting step (S31) is a step of, after setting an image area in a normal state of a monitoring target, accumulating edge characteristics of a plurality of images in unit of pixels and learning an averaged master image.

That is, a master image is generated by combining edge characteristics of several hundreds of images obtained by photographing normal states by using an edge (periphery or corner) characteristic detecting algorithm of an image realized in the image recognition application.

The matching rate setting step (S32) is a step of storing a matching rate and a storage condition, in which border values are set in a normal state and an abnormal state of the monitoring target. The user may arbitrarily set the matching rate.

The image monitoring event generating step (S33) is a step of receiving and detecting an image monitoring event signal output by the imaging module 110, by the diagnostic module 120, generating an image monitoring event that coincides with a preset image monitoring event condition, in the diagnostic module 120, and transmitting a signal to the imaging module 110.

The image file storing step (S34) is a step of acquiring a current state image of the monitoring target at the image monitoring event generating time point by the imaging module 110, and storing the current state image as an image file if a storage condition is satisfied according to the matching rate after the current state image is compared with the master image.

Further, in the image file storing step (S34), image data of a monitoring target captured by the imaging device in a time area of a before/after range with reference to an image monitoring event generation time point are acquired and edited and are stored in an image file.

Meanwhile, in the facility diagnosis method using a facility diagnosis system of the present disclosure, a plurality of IoT sensor units 130 that monitor a monitoring target is provided, and the facility diagnosis method includes an IoT event generating step (S41), an image file storing step (S41), and an IoT notifying step (S43).

That is, when the IoT sensor unit 130 satisfies a preset condition after a situation in a monitoring zone which is determined to require monitoring by the user, for example, a situation such as control of entrance/exit, detection of intrusion, or stealth of a facility is assumed, the diagnostic module 120 detects an IoT monitoring event signal to generate an IoT monitoring event.

The IoT event generating step (S41) is a step of receiving and detecting an IoT monitoring event signal through a hardware contact point or a wired/wireless communication with the IoT sensor units 130, by the diagnostic module 120, generating an IoT monitoring event corresponding to a preset IoT monitoring event condition, in the diagnostic module 120, and transmitting a signal to the imaging module 110.

The image file storing step (S42) is a step of acquiring and editing image data of the monitoring target photographed by an imaging device in a time area of a before/after range with reference to the IoT monitoring event generation time point and storing the edited image data as an image file.

The IoT notifying step (S43) is a step of transmitting an IoT monitoring event generation notification to a smartphone of the user, by the diagnostic module 120.

The above-described facility diagnosis method using a facility diagnosis system according to the present disclosure uses a facility diagnosis system 100 including a diagnostic module 120 that interworks a PLC, an imaging module 110 that interworks the diagnostic module 120, and an IoT sensor unit 130, and a diagnosis of a failure of a facility, a cause of which is difficult to recognize, can be effectively made by generating various kinds of events according to designated conditions of the user for situations of the facility.

Accordingly, according to the present disclosure, a precise cause can be promptly recognized by converting state information and data values of a PLC memory area to a form of data files that may be recognized by the user more easily and conveniently and providing the state information and the data values to the user for kinds and generation dates and times of an event through the diagnosis event generating step to the file storing step (S11 to S13), and the user can cope with the diagnosis of a failure more promptly through the master memory pattern setting step to the memory pattern notifying step (S21 to S22).

Further, according to the present disclosure, an abnormal operation can be diagnosed and recognized easily in a software way by using a general imaging device even without introducing a high-priced vision system through the master image setting step to the image file storing step (S31 to S34).

INDUSTRIAL APPLICABILITY

The present disclosure can achieve various effects, for example, of promptly performing a diagnosis and a measure by applying an IoT technology to a facility diagnosis system 100 by connecting the a facility controller, a facility diagnosis system, and a user in real time through the IoT event generating step to the IoT notifying step (S41 to S43).

The invention claimed is:

1. A facility diagnosis method using a facility diagnosis system comprising an imaging module (110) configured to photograph a facility, in which a facility controller on which a PLC is mounted is embedded, and a diagnostic module (120) comprising hardware, on which software for diagnosing a failure of the facility is mounted, the facility diagnosis method comprising:
   a diagnosis event generating step (S11) of receiving and detecting a PLC memory map access signal (P) output by the facility controller, by the diagnostic module (120), and generating diagnosis events for kinds corresponding to a plurality of preset event conditions, in the diagnostic module (120);
   a storage range setting step (S12) of arbitrarily selecting ranges of state information and a data value of a PLC memory area, which is to be stored at a diagnosis event generation time point, and setting a time area of a before/after range with reference to the diagnosis event generation time point by the diagnostic module (120); and
   a file storing step (S13) of storing the state information and the data value of the PLC memory area in the range selected in the storage range setting step in real time, by the diagnostic module (120),
   wherein the diagnostic module (120) is configured to selectively perform:
   a master memory pattern setting step (S21) of mounting memory pattern recognition software, storing state information and a data value of the PLC memory area during one cycle of a normal state operation of the facility, and setting the state information and the data value stored, as a master memory pattern; and
   a memory pattern notifying step (S22) of reading the PLC memory area in real time during an operation of the facility, comparing the read PLC memory area with the master memory pattern, and displaying an area in which the read PLC memory does not coincide with the master memory pattern, and
   wherein in the file storing step (S13),
   the state information and the data value of the PLC memory area are stored in the form of data files for kinds of diagnosis events and generation dates and times, areas for an input/output, an internal relay, a link relay are converted in unit of bits to display an operational state thereof, areas for a data register and a link register are converted in unit of decimal numbers after being read in unit of words to be displayed and stored, and to be provided to a user.

2. The facility diagnosis method of claim 1, wherein an image recognition application is mounted on the imaging module (110) of the facility diagnosis system, the facility diagnosis method comprising:
   a master image setting step (S31) of, after setting an image area in a normal state of a monitoring target, accumulating edge characteristics of a plurality of images in unit of pixels and learning an averaged master image;
   a matching rate setting step (S32) of storing a matching rate and a storage condition, in which border values are set in a normal state and an abnormal state of the monitoring target;

an image monitoring event generating step (S33) of receiving and detecting an image monitoring event signal output by the imaging module (110), by the diagnostic module (120), generating an image monitoring event that coincides with a preset image monitoring event condition, in the diagnostic module (120), and transmitting a signal to the imaging module (110); and an image file storing step (S34) of acquiring a current state image of the monitoring target at the image monitoring event generating time point by the imaging module (110), and storing the current state image as an image file if a storage condition is satisfied according to the matching rate after the current state image is compared with the master image, and wherein the image file storing step (S34) comprises:

acquiring and editing image data of the monitoring target photographed by an image device in a time area of the before/after range with reference to the image monitoring event generation time point, and storing the edited image data as an image file.

3. The facility diagnosis method of claim 1, wherein the facility diagnosis system comprises a plurality of IoT sensor units (130) configured to monitor the monitoring target, the facility diagnosis method comprising:

an IoT event generating step (S41) of receiving and detecting an IoT monitoring event signal through a hardware contact point or a wired/wireless communication with the IoT sensor units (130), by the diagnostic module (120), generating an IoT monitoring event corresponding to a preset IoT monitoring event condition, in the diagnostic module (120), and transmitting a signal to the imaging module (110);

an image file storing step (S42) of acquiring and editing image data of the monitoring target photographed by an imaging device in a time area of a before/after range with reference to the IoT monitoring event generation time point and storing the edited image data as an image file; and an IoT notifying step (S43) of transmitting an IoT monitoring event generation notification to a smartphone of the user, by the diagnostic module (120).

* * * * *